(12) United States Patent
Hayashi et al.

(10) Patent No.: US 11,341,381 B2
(45) Date of Patent: May 24, 2022

(54) RECORDING DEVICE AND METHOD SETTING AMOUNT OF BLACK IN EDGE REGION GREATER THAN AMOUNT OF BLACK IN INNER REGION

(71) Applicant: SEIKO EPSON CORPORATION, Tokyo (JP)

(72) Inventors: Takuma Hayashi, Nagano (JP); Yasutoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 16/912,805

(22) Filed: Jun. 26, 2020

(65) Prior Publication Data
US 2020/0410308 A1 Dec. 31, 2020

(30) Foreign Application Priority Data
Jun. 28, 2019 (JP) .............................. JP2019-121694

(51) Int. Cl.
| G06K 15/10 | (2006.01) |
| B41J 2/21 | (2006.01) |
| H04N 1/409 | (2006.01) |
| H04N 1/60 | (2006.01) |

(52) U.S. Cl.
CPC .............. *G06K 15/102* (2013.01); *B41J 2/21* (2013.01); *H04N 1/4092* (2013.01); *H04N 1/6022* (2013.01); *G06K 2215/0094* (2013.01); *G06K 2215/0097* (2013.01)

(58) Field of Classification Search
None
See application file for complete search history.

(56) References Cited

U.S. PATENT DOCUMENTS

| 2003/0048460 A1* | 3/2003 | Vinals-Matas | B41J 3/01 358/1.8 |
| 2005/0057604 A1* | 3/2005 | Ogasawara | B41J 29/393 347/41 |
| 2007/0121130 A1 | 5/2007 | Yoshida | |
| 2008/0229424 A1* | 9/2008 | Harris | G06Q 50/18 726/26 |

FOREIGN PATENT DOCUMENTS

| JP | 2014-156068 A | 8/2014 |
| JP | 2018-069603 A | 5/2018 |

* cited by examiner

*Primary Examiner* — Scott A Rogers
(74) *Attorney, Agent, or Firm* — Global IP Counselors, LLP

(57) ABSTRACT

A recording device includes a recording unit configured to execute recording on a recording medium using a color material of cyan, magenta, yellow, and black, and a control unit configured to control recording executed by the recording unit, wherein the control unit causes the recording unit to record an edge region of black data included in image data using at least the color material of black, causes the recording unit to record an inner region on an inner side of the edge region of the black data using at least the color material of cyan, magenta, and yellow, and sets the amount of the color material of black per unit area of the edge region to be greater than the amount of the color material of black per unit area of the inner region.

5 Claims, 5 Drawing Sheets

RECORDING DEVICE AND METHOD SETTING AMOUNT OF BLACK IN EDGE REGION GREATER THAN AMOUNT OF BLACK IN INNER REGION

The present application is based on, and claims priority from JP Application Serial Number 2019-121694, filed Jun. 28, 2019, the disclosure of which is hereby incorporated by reference herein in its entirety.

BACKGROUND

1. Technical Field

The present disclosure relates to a recording device and a recording method.

2. Related Art

There is known a method for manufacturing a crimped postcard paper in which an electronic watermark image or a two-dimensional code is printed on an inner surface of a crimped postcard, and when the crimped postcard is peeled off, a transfer of the electronic watermark image or the two-dimensional code can be suppressed (see JP-A-2014-156068).

According to JP-A-2014-156068, at least one of a first paper piece and a second paper piece of the crimped postcard paper is coated with a pressure-sensitive glue, and an image printed layer printed by an ink-jet method is formed on one of the first paper piece and the second paper piece, in a paper piece different from the paper piece on which the image printed layer is formed, when the two paper pieces are folded, a transfer preventing layer printed by an ink-jet method is formed at a position where the image printed layer contacts.

In JP-A-2014-156068, in order to prevent a transfer of recording result, it is necessary to form the transfer preventing layer on the paper piece different from the paper piece on which the printed layer is formed. Furthermore, in addition to preventing the transfer, it is also necessary to suppress deterioration in quality of the recording result.

SUMMARY

A recording device includes a recording unit configured to execute recording on a recording medium using a color material of cyan, magenta, yellow, and black, and a control unit configured to control recording executed by the recording unit, wherein the control unit causes the recording unit to record an edge region of black data included in image data using at least the color material of black, causes the recording unit to record an inner region on an inner side of the edge region of the black data using at least the color material of cyan, magenta, and yellow, and sets the amount of the color material of black per unit area of the edge region to be greater than the amount of the color material of black per unit area of the inner region.

DESCRIPTION OF EXEMPLARY EMBODIMENTS

Exemplary embodiments of the present disclosure will be described below with reference to the accompanying drawings. Note that each of the accompanying drawings is merely illustrative for describing the present embodiment. Since the accompanying drawings are illustrative, they may not be aligned with each other or may be partially omitted.

1. Device Configuration

Figure 1:
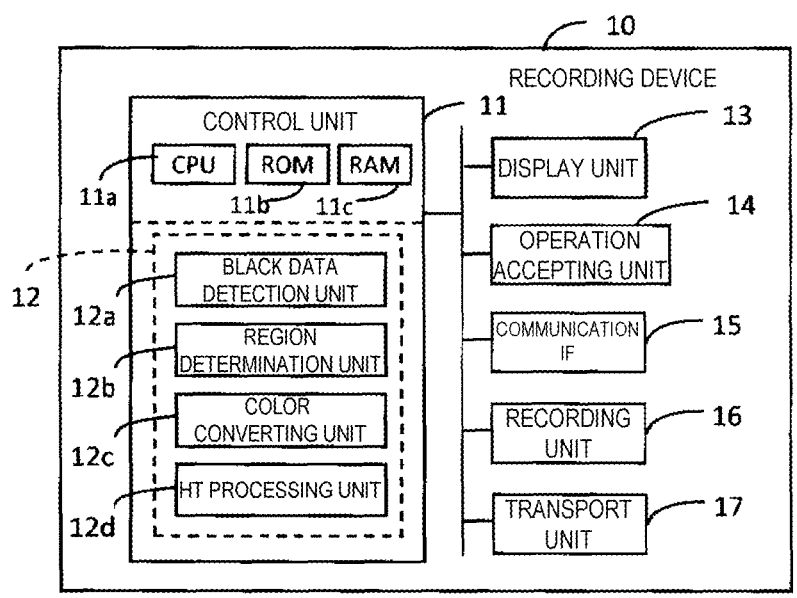
FIG. 1 is a block view illustrating a configuration of a recording device.

FIG. 1 schematically illustrates a configuration of a recording device 10 according to the present embodiment.

The recording device 10 is configured to execute a recording method. The recording device 10 includes a control unit 11, a display unit 13, an operation accepting unit 14, a communication interface 15, a recording unit 16, and a transport unit 17. The interface is abbreviated as IF. The control unit 11 is configured to include one or more ICs having a CPU 11a, a ROM 11b, a RAM 11c, and the like as a processor, and other non-volatile memory, and the like.

In the control unit 11, the processor, that is, the CPU 11a controls the recording device 10 by executing calculation processing according to a program stored in the ROM 11b or other memories and the like, using the RAM 11c or the like as a work area. The control unit 11 functions as a black data detection unit 12a, a region determination unit 12b, a color converting unit 12c, a HT processing unit 12d, and the like according to the program 12. HT is an abbreviation for halftone. Note that, the processor is not limited to one CPU, and may be configured to perform processing by a plurality of CPUs or a hardware circuit such as an ASIC, and may have a configuration in which the CPU and the hardware circuit cooperate to perform processing.

The display unit 13 is a unit configured to display visual information, and includes, for example, a liquid crystal display, an organic EL display, or the like. The display unit 13 may be configured to include a display and a driving circuit configured to drive the display. The operation accepting unit 14 is a unit configured to accept an operation by a user, and is realized by, for example, a physical button, a touch panel, a mouse, a keyboard, or the like. Of course, the touch panel may be realized as a function of the display unit 13.

The display unit 13 and the operation accepting unit 14 may be part of the configuration of the recording device 10, or may be peripheral devices external to the recording device 10. The communication IF 15 is a general term for one or a plurality of IF(s) for enabling the recording device 10 to perform wired or wireless communication with the outside according to a predetermined communication protocol including a known communication standard.

The transport unit 17 transports the recording medium set by the user in a predetermined direction under the control of the control unit 11. The transport unit 17 includes a motor, a roller, and the like (not illustrated) for transporting the recording medium. The recording medium is typically paper, but may be a medium of a material other than paper.

The recording unit 16 performs recording based on recorded data under the control of the control unit 11. The recording unit 16 is capable of performing recording using a color material of cyan (C), magenta (M), yellow (Y), and black (K). The color material is ink or toner. In addition to CMYK, the recording unit 16 may also use other color material of such as light cyan or light magenta. The recording unit 16 discharges each ink of CMYK from a nozzle (not illustrated) onto the recording medium conveyed by the transport unit 17, according to the recorded data by, for example, an ink-jet method. According to the ink-jet method, an image is recorded on the recording medium by attaching dots of ink to the recording medium. The recording device 10 adopting the ink-jet method may be referred to as an ink-jet printer.

The recording device 10 may be a multifunction peripheral having not only a function as a printer, but also a plurality of functions such as a copying function, a facsimile function, and the like. Further, the recording device 10 may be a single device that functions as a printer, but may include a plurality of devices communicably connected. For example, the control unit 11 may be realized by a personal computer, a smartphone, a tablet-type terminal, a mobile phone, or an image processing apparatus having the same processing capability, and the recording device 10 may include the image processing device and a printer including the recording unit 16 and the transport unit 17. The recording device 10 including a plurality of devices can be regarded as a system.

2. Recording Method

Figure 2:
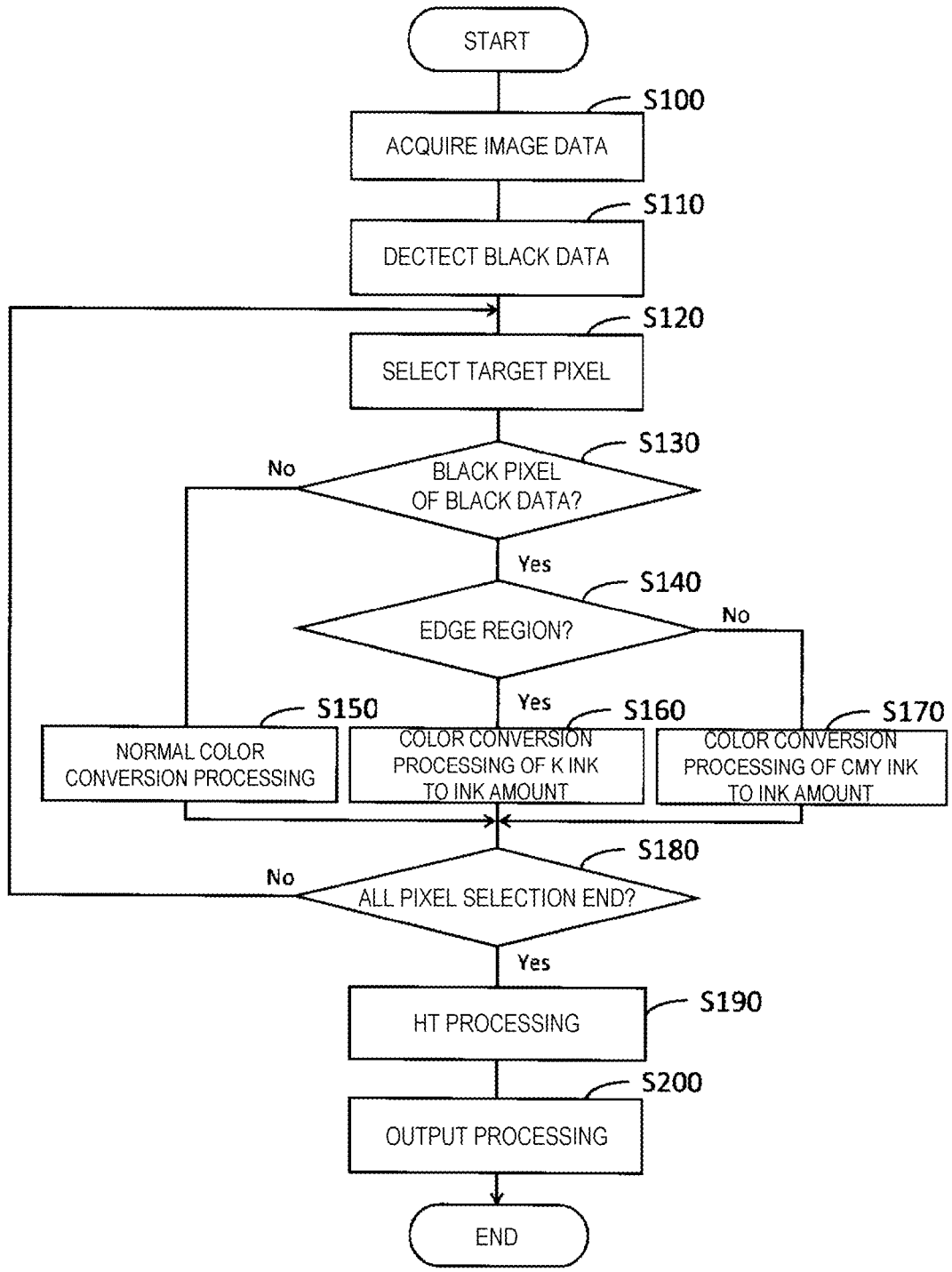
FIG. 2 is a flowchart illustrating a recording control processing.

FIG. 2 illustrates, in a flowchart, a recording control process executed by the control unit 11 according to the program 12.

In step S100, the control unit 11 acquires image data to be processed. The image data acquired in step S100 is simply referred to as image data. For example, the control unit 11 acquires the image data from a storage source of the image data, in response to an instruction to select the image data by the user via the operation accepting unit 14. The storage source of the image data varies from a memory or a hard disk drive included in the recording device 10, or an external memory or server to which the control unit 11 is accessible via the communication IF 15.

The image data is, for example, bitmap data having a gray-scale value for each RGB (red, green, blue) for each pixel. The gray-scale value is represented by, for example, 256 gradations from 0 to 255. Of course, the control unit 11 can acquire RGB bitmap data to be processed by appropriately converting the format of the acquired image data.

In step S110, the black data detection unit 12a detects black data included in the image data. The "black data" does not simply mean a black pixel, but means an image region represented by a collection of a plurality of black pixels. The black pixel is a pixel in which each of the RGB gray-scale value is zero. A pixel in which each of the RGB gray-scale value is not greater than a predetermined gray-scale value near zero may also be included in the black pixel.

Specific examples of black data include characters represented by black pixels and codes represented by black pixels. The code is a type of pattern image in which information is encoded, and is a barcode, a QR code (registered trademark), or other two-dimensional code. Therefore, in step S110, the black data detection unit 12a detects an object such as a character or a code corresponding to the black data from the image data. Various methods such as image recognition, pattern matching, and the like can be used as a method for detecting the character and the code. If the image data does not include an object corresponding to the black data, no result is detected in step S110. Hereinafter, the description will be continued on the assumption that the black data is detected by the black data detection unit 12a in step S110.

In step S120, the control unit 11 selects a pixel to be subjected to the color conversion processing from the pixels constituting the image data. The color conversion processing is a processing in which the recording unit 16 converts a color system of the image data into an output color system used for recording. The pixel selected in step S120 is hereinafter referred to as a "target pixel".

In step S130, the control unit 11 determines whether the target pixel corresponds to the black pixel constituting the black data detected in step S110. When the target pixel corresponds to the black pixel constituting the black data, the control unit 11 determines "Yes" in step S130 and proceeds to step S140. When the target pixel does not correspond to the black pixel constituting the black data, the control unit 11 determines "No" in step S130 and proceeds to step S150.

In step S140, the control unit 11 determines whether the target pixel is a pixel included in an edge region of the black data. In step S140, a region determination by the region determination unit 12b is also performed. The region determination unit 12b detects an edge of the black data based on the image data. The edge is a pixel whose color change amount is not less than a predetermined reference when compared with an adjacent pixel in a predetermined direction. The edge detection method is not particularly limited, and various detection methods can be adopted including a known method. The region determination unit 12b determines a region of the black data where the pixels detected as the edges are continuous as an "edge region", and determines a region of the black data on an inner side of the edge region as an "inner region" of the black data.

When the target pixel is a pixel included in the edge region determined by the region determination unit 12b, the control unit 11 determines "Yes" in step S140 and proceeds to step S160. On the other hand, when the target pixel is a pixel included in the inner region determined by the region determination unit 12b, the control unit 11 determines "No" in step S140 and proceeds to step S170.

In step S160, the color converting unit 12c executes a color conversion processing that converts the target pixel to an ink amount of K ink. In other words, the color converting unit 12c converts the RGB gray-scale value of the target pixel to a K gray-scale value. The color converting unit 12c executes the color conversion processing in step S160 by referring to a first color conversion LUT in which a conversion relationship between RGB and CMYK is predetermined. LUT is an abbreviation for a look-up table. When the target pixel is a black pixel, the first color conversion LUT is a LUT that converts the RGB of the target pixel to a K gray-scale value that is not 0 and does not generate a CMY gray-scale value (C=M=Y=0).

In step S170, the color converting unit 12c executes a color conversion processing that converts the target pixel to an ink amount of CMY ink. In other words, the color converting unit 12c converts the RGB gray-scale value of the target pixel to a CMY gray-scale value. The color converting unit 12c executes the color conversion processing of step S170 by referring to a second color conversion LUT in which a conversion relationship between RGB and CMYK is predetermined. When the target pixel is a black pixel, the second color conversion LUT is a LUT that converts the RGB of the target pixel to a CMY gray-scale value that is not zero and does not generate a K gray-scale value (K=0).

In step S150, the color converting unit 12c executes a normal color conversion processing on the target pixel. In other words, the color converting unit 12c converts the RGB gray-scale value of the target pixel to a CMYK gray-scale value. The target pixel on which the color conversion processing is performed in step S150 is a pixel that is not a black pixel or a black pixel that does not constitute the black data. The color conversion LUT that the color converting unit 12c refers to in the color conversion processing of step S150 is not particularly limited, but the second color conversion LUT is not referred to in step S150. The color converting unit 12c may refer to the first color conversion LUT in the color conversion processing of step S150.

When the first color conversion LUT is referred to in the color conversion processing of step S150, both steps S150 and S160 can be regarded as a normal color conversion processing. Further, steps S130 to S170 may be a simpler flow. In other words, when the target pixel is a black pixel included in the inner region, the control unit 11 may execute the color conversion processing in step S170 by referring to the second color conversion LUT, and when the target pixel does not correspond to a black pixel included in the inner region, the control unit 11 may execute a normal color conversion processing by referring to the first color conversion LUT.

In step S180 after any of the steps S150, S160, and S170, the control unit 11 determines whether all of the pixels constituting the image data have been selected as target pixels. When a pixel that is not selected as a target pixel remains in the image data, the control unit 11 determines "No" in step S180, returns to step S120, and selects the pixel not selected as a new target pixel. On the other hand, when no pixel that is not selected as a target pixel remains in the image data, the control unit 11 determines "Yes" in step S180, and proceeds to step S190.

In step S190, the HT processing unit 12d executes a HT processing on the image data after the color conversion. The HT processing is schematically a processing of binarizing the gray-scale value for each pixel and each ink of the image data to information indicating recording (dot-on) or non-recording (dot-off) of the ink. The HT processing unit 12d executes HT processing using, for example, a dither method or an error diffusion method.

For black pixels included in the edge region performed the color conversion processing in step S160, the dot-on or dot-off of the K ink is defined by the HT processing in step S190. For black pixels included in the inner region performed the color conversion processing in step S170, the dot-on or dot-off of each of the CMY inks is defined by the HT processing in step S190.

For pixels performed the color conversion processing in step S150, the dot-on or dot-off of each of the CMYK inks is defined by the HT processing in step S190.

In step S200, the control unit 11 outputs the image data after the HT processing to the recording unit 16 as recorded data. In an output processing in step 200, the image data after the HT processing is appropriately rearranged according to the timing or order used by the recording unit 16, and then output to the recording unit 16. Such output processing is also referred to as a rasterization processing. As a result, the recording unit 16 executes recording based on the input recorded data.

Figure 3:
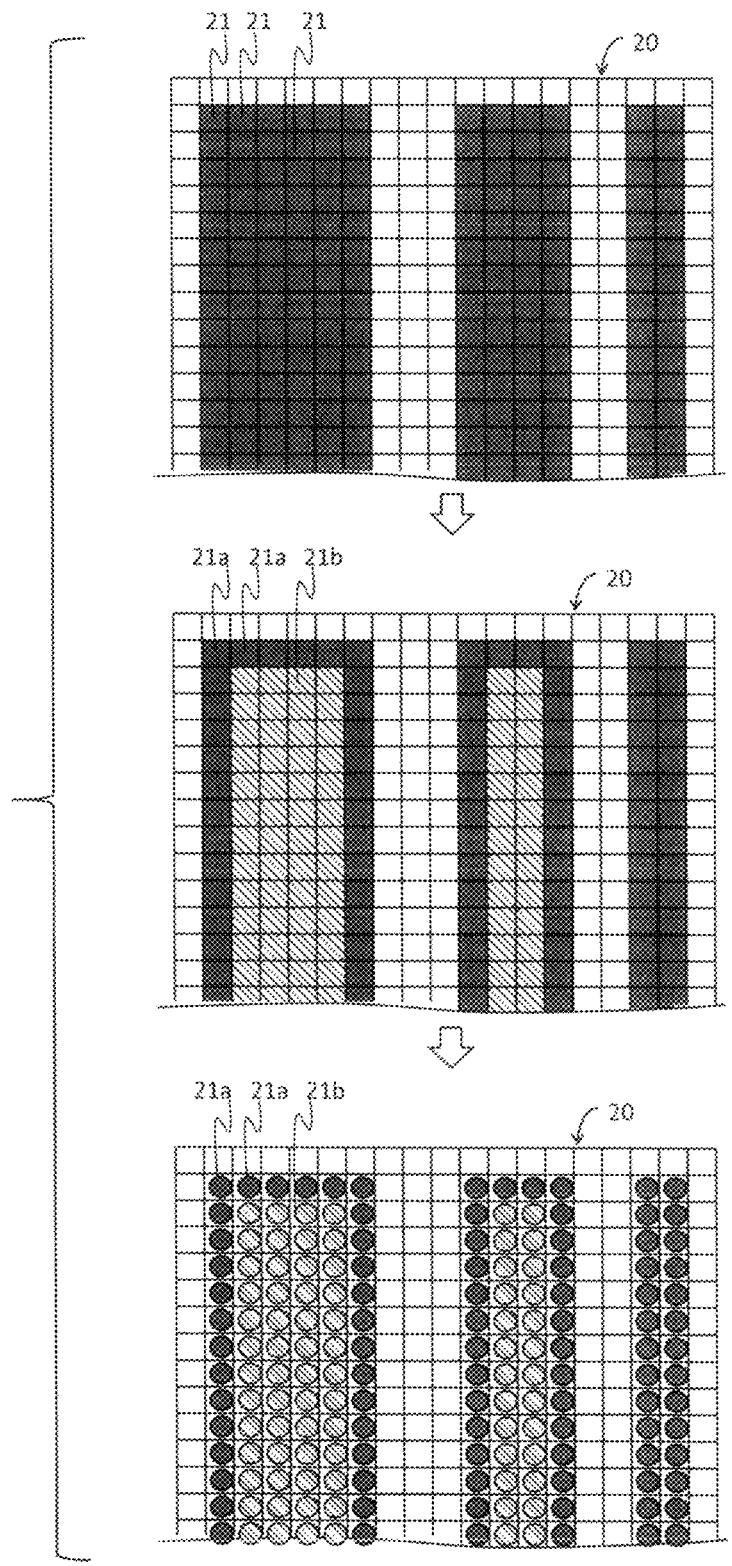
FIG. 3 is a diagram illustrating a state in which image data including black data is processed.

FIG. 3 illustrates a state of the image data processed according to the flowchart of FIG. 2. Reference numeral 20 indicates an image region 20 that is a part of the image data. Each rectangle constituting the image region 20 indicates a pixel. Reference numeral 21 in upper part of FIG. 3 indicates a black pixel 21 in the image region 20. The upper part of FIG. 3 illustrates a part of a barcode as an example of black data by a set of black pixels 21 painted black. More specifically, each of a plurality of bars constituting the barcode is black data.

As described above, the region determination unit 12b determines the edge region and the inner region of the black data. In middle part of FIG. 3, each of the black pixels 21 constituting the black data in the image region 20 is divided into an edge region and an inner region for easy understanding. That is, in the middle part of FIG. 3, the black pixels 21 painted black in the same manner as the upper part of FIG. 3 are black pixels 21 constituting the edge region, and the black pixels 21 shaded are black pixels 21 constituting the inner region. Note that, in the middle part of FIG. 3, the black pixels 21 constituting the edge region are indicated by reference numeral 21a, and the black pixels 21 constituting the inner region are indicated by reference numeral 21b. The black pixel 21a is subject to the color conversion processing in step S160, and the black pixel 21b is subject to the color conversion processing in step S170.

The lower part of FIG. 3 illustrates the result of executing the HT processing in step S190 on the image region 20. In the lower part of FIG. 3, a black circle means that a dot of K ink is defined in a corresponding pixel. In other words, according to step S160, a K gray-scale value of CMYK is generated for the black pixel 21a, thus, as a result of the HT processing in step S190, the K ink is dot-on for the black pixel 21a. In the example of FIG. 3, the K ink is dot-on for all of the black pixels 21a, but depending on the method of HT processing adopted by the HT processing unit 12d, the K ink may be dot-off for a part of the black pixels 21a.

In the lower part of FIG. 3, a shaded circle means that a dot of each of the CMY inks is defined for a corresponding pixel. In other words, according to step S170, the CMY gray-scale value of CMYK are generated for the black pixel 21b, thus, as a result of the HT processing in step S190, each of the CMY inks is dot-on for the black pixel 21b. By overlapping or mixing dots of each of the CMY inks, black color, referred to as composite black, is realized. Thus, the shaded circles in the lower part of FIG. 3 indicate dots that realize composite black on the recording medium. However, not all of the black pixels 21b are specified with dots of all CMY colors. Depending on the method of HT processing adopted by the HT processing unit 12d, all or a part of the CMY inks may be dot-off for a part of the black pixels 21b.

The image region 20 after executing the HT processing as described above is recorded on the recording medium by the recording unit 16 via the output processing in step S200. In other words, the control unit 11 causes the recording unit 16 to record the edge region of the black data included in the image data using the K ink, and record the inner region of the black data using the CMY ink. According to the above description, the control unit 11 does not use the K ink for the recording in the inner region. Furthermore, the control unit 11 does not use the CMY ink for the recording in the edge region.

However, the control unit 11 may cause the recording unit 16 to use the K ink for the recording in the inner region, or use the CMY ink for the recording in the edge region.

Figure 4:
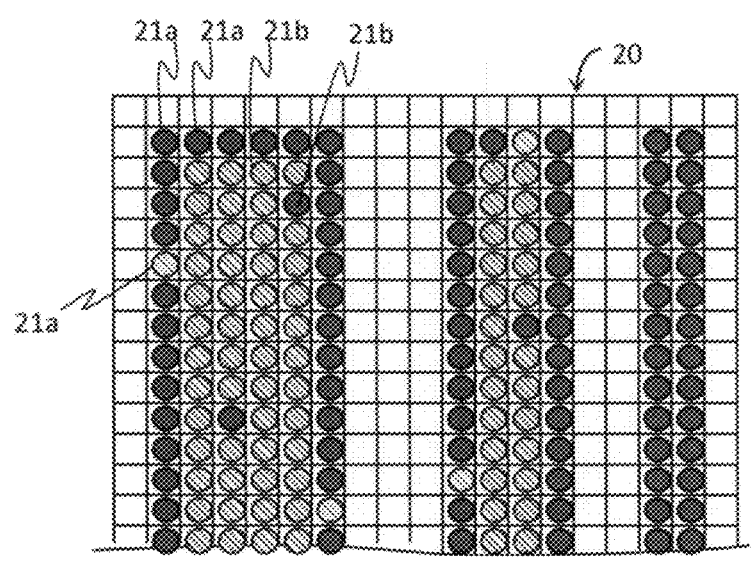
FIG. 4 is a diagram illustrating an image region in which K ink is dot-on in a portion of an edge region of black data, and CMY ink is dot-on in a portion of an inner region.

FIG. 4 illustrate a result of executing the HT processing in step S190 on the image region 20, which is different from the example illustrated in the lower part of FIG. 3. According to FIG. 4, a part of the black pixels 21a constituting the edge region is indicated as a shaded circle, that is, a dot of each of the CMY inks, rather than a black circle, that is, a dot of the K ink. Further, according to FIG. 4, a part of the black pixels 21b constituting the inner region is indicated as a black circle, that is, a dot of the K ink, rather than a shaded circle, that is, a dot of each of the CMY inks.

For example, in step S160, the control unit 11 may generate a CMY gray-scale value instead of a K gray-scale value for a part of the target pixels, or in step S170, the control unit 11 may generate a K gray-scale value instead of a CMY gray-scale value for a part of the target pixels. Alternatively, in the processing of step S190, the control unit 11 may replace the dot of K ink defined for a part of the black pixels 21a with the dot of each of the CMY inks, or replace the dot of each of the CMY inks defined for a part of the black pixel 21b with the dot of K ink.

As described above, even when the K ink as well as the CMY ink is used for the recording in the inner region, the control unit 11 sets the amount of K ink per unit area of the edge region greater than the amount of K ink per unit area of the inner region. The unit area is an area composed of a predetermined number of pixels, for example, one pixel. The control unit 11 controls the dot-on and the dot-off of the K ink so that the number of dots of K ink per pixel in the edge region>the number of dots of K ink per pixel in the inner region is satisfied. Additionally, even when the K ink as well as the CMY ink is used for the recording in the edge region, the control unit 11 sets the amount of CMY ink per unit area of the edge region less than the amount of CMY ink per unit area of the inner region. The control unit 11 controls the dot-on and the dot-off of the CMY ink so that the number of dots of CMY ink per pixel in the edge region<the number of dots of CMY ink per pixel in the inner region is satisfied.

3. Summary

As described above, according to the present embodiment, the recording device 10 includes a recording unit 16 configured to execute recording on a recording medium using a color material of CMYK, and a control unit 11 that controls the recording by the recording unit 16. The control unit 11 causes the recording unit 16 to record the edge region of the black data included in the image data using at least the color material of K, and causes the recording unit 16 to record the inner region on the inner side of the edge region of the black data using at least the color material of CMY, and sets the amount of the color material of K per unit area of the edge region to be greater than the amount of the color material of K per unit area of the inner region.

By using greater amount of K ink in the recording of the black data, the transfer of the recording result of the black data on the recording medium to another medium becomes remarkable. In such a situation, according to the above-described configuration, when recording the black data such as characters or codes, the recording device 10 records the edge region using only the K ink or mainly the K ink, and records the inner region using only the CMY ink or mainly the CMY ink. That is, by recording the inner region with composite black, the amount of the K ink used is entirely suppressed, and the transfer is reduced or made less noticeable. Additionally, by recording the edge region using the K ink, the edge of the black data such as characters or codes is made clear, and deterioration in quality of the recording result is suppressed. In particular, the code such as a barcode or a two-dimensional code to be read by a barcode reader or the like after recording reduces reading accuracy when the edge is unclear, but according to the present embodiment, deterioration in the reading accuracy of the code can be prevented.

In addition, according to the present embodiment, there is no need for a complicated process, as described in JP-A-2014-156068, of forming the transfer preventing layer on which the image printed layer of a paper piece comes into contact with the image printed layer of a different paper piece.

In addition, according to the present embodiment, the control unit 11 may set the amount of the color material of K in the inner region to zero, as illustrated in FIG. 3.

According to the configuration, the use of K ink for the recording of the inner region can be prohibited and the transfer can be reduced.

In addition, according to the present embodiment, the control unit 11 may set the amount of the color material of CMY in the edge region to zero, as illustrated in FIG. 3.

According to the configuration described above, it is possible to inhibit the use of the CMY ink for the recording in the edge region, and the edge of the black data in the recording result can be made clear.

Furthermore, the present embodiment discloses a recording method for controlling the recording unit 16 capable of executing the recording using the color material of CMYK. According to the recording method, the recording unit 16 is caused to record the edge region of the black data included in the image data using at least the color material of K, and record the inner region on the inner side of the edge region of the black data using at least the color material of CMY, and the amount of the color material of K per unit area of the edge region is set to be greater than the amount of the color material K per unit area of the inner region.

4. Modified Example

The transfer of the color material after recording may be particularly problematic when recording is performed on the recording surface of a crimped recording medium, such as a crimped postcard paper, in which a sealing medium is crimped onto the recording surface after recording on the recording surface. Thus, the control unit 11 can execute a first recording mode in which the recording method described above is executed, or a second recording mode in which the recording unit 16 records the black data using only the color material of K, and the control unit 11 may execute the first recording mode when recording on the crimped recording medium and may executed the second recording mode when recording on a recording medium other than the crimped recording medium.

Of cause, the first recording mode is a mode in which the recording unit 16 is caused to record the edge region using at least the color material of K, and record the inner region using at least the color material of CMY, and the amount of the color material of K per unit area of the edge region set to be greater than the amount of the color material of K per unit area of the inner region.

Figure 5:
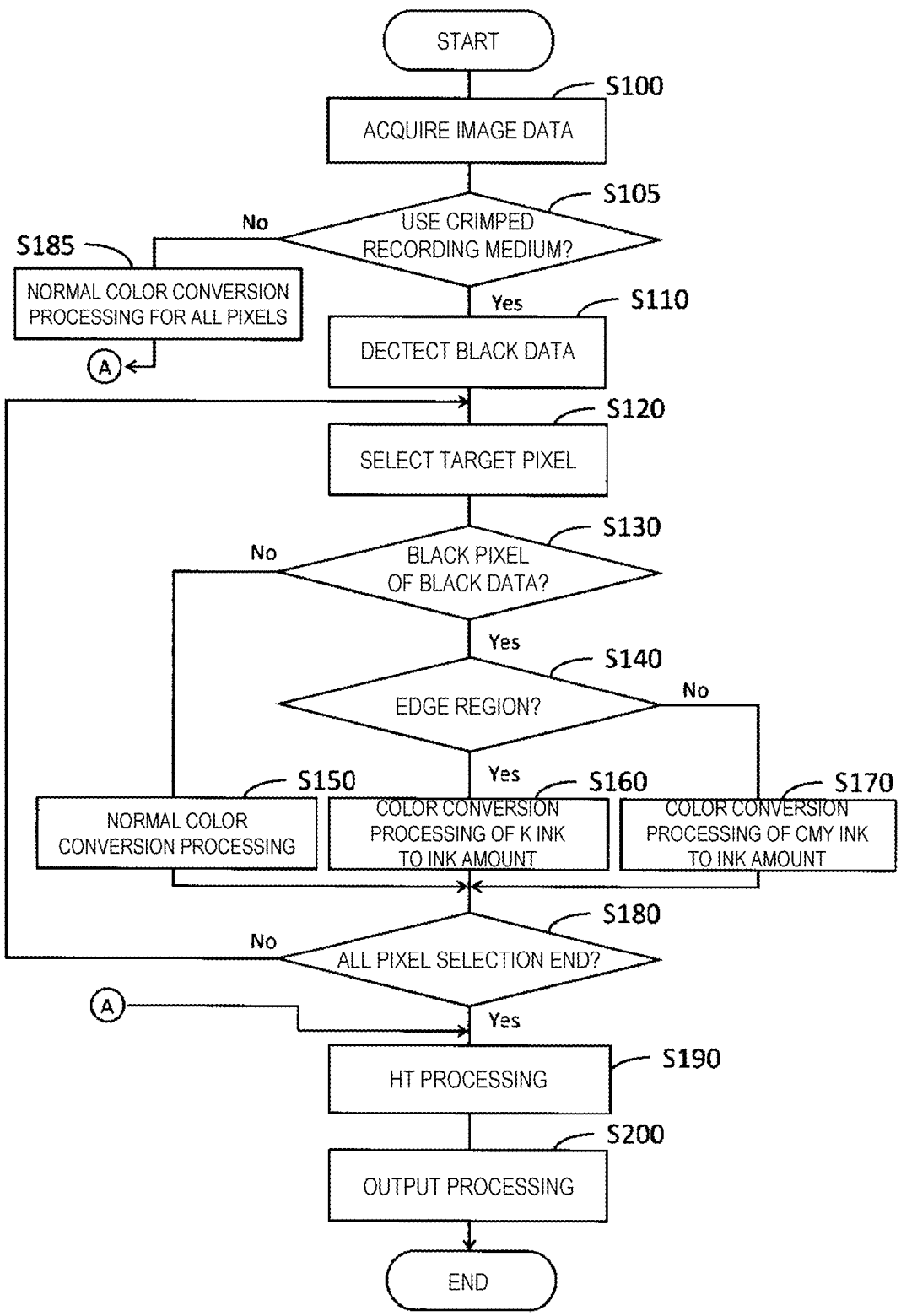
FIG. 5 is a flowchart illustrating a recording control processing according to a modified example.

FIG. 5 illustrates, in flow chart, a recording control processing according to a modified example executed by the control unit 11 according to the program 12. FIG. 5 is described with respect to differences from FIG. 2. FIG. 5 differs from FIG. 2 in including steps S105 and S185.

The control unit 11 determines whether a crimped recording medium is used for recording (Step S105). As one of various settings for the recording device 10, the user previously sets the type of recording medium to be used for recording by operating the operation accepting unit 14.

Based on the setting, the control unit 11 determines whether the type of the recording medium used for recording is the crimping recording medium. When the control unit 11 determines that the type of the recording medium used for recording is the crimping recording medium, the control unit 11 determines "Yes" in step S105, and performs the steps from step S110. That is, when the processing proceeds from step S105 to step S110, the first recording mode is executed.

When the control unit 11 determines that the type of recording medium used for recording is not the crimping recording medium, the control unit 11 determines "No" in step S105 and performs step S185. In step S185, the control unit 11 executes a normal color conversion processing on all the pixels of the image data. The normal color conversion processing according to step S185 is performed referring to a first color conversion LUT as described above. Therefore, in step S185, the gray-scale value of the black pixel included in the image data is converted only to the gray-scale value of the K ink. The control unit 11 proceeds to step S190 via step S185. In step S190, after step S185, dot-on or dot-off of the K ink is defined for black pixels, and dot-on of the CMY ink is not defined. Therefore, the black data is recorded by using only the K ink. Thus, when the processing proceeds from the branch of step S105 to step S185, the second recording mode is executed.

According to the modified example described above, when the recording is performed on the crimping recording medium in which the transfer of the black data is easily generated, by executing the first recording mode, the transfer can be suppressed and a deterioration in recording quality can be suppressed.

The transfer may also occur when a toner is used as the color material. Therefore, the present embodiment can be applied not only to a recording device using the ink-jet method, but also to a recording device configured to execute recording by an electrophotographic method in which a toner or the like is used.

What is claimed is:

1. A recording device comprising:
   a recording unit configured to execute recording on a recording medium using a color material of cyan, magenta, yellow, and black; and
   a control unit configured to control recording executed by the recording unit, wherein
   the control unit causes the recording unit to record an edge region of black data included in image data using at least the color material of black, causes the recording unit to record an inner region on an inner side of the edge region of the black data using at least the color material of cyan, magenta, and yellow, and sets the amount of the color material of black per unit area of the edge region to be greater than the amount of the color material of black per unit area of the inner region.

2. The recording device according to claim 1, wherein the control unit is configured to set the amount of the color material of black in the inner region to zero.

3. The recording device according to claim 1, wherein the control unit is configured to set the amount of the color material of cyan, magenta, and yellow in the edge region to zero.

4. The recording device according to claim 1, wherein the control unit is configured to execute: a first recording mode in which the recording unit records the edge region using at least the color material of black, and records the inner region using at least the color material of cyan, magenta, and yellow, and the amount of the color material of black per unit area of the edge region is set to be greater than the amount of the color material of black per unit area of the inner region; or a second recording mode in which the recording unit records the black data using only the color material of black, and the control unit is configured to execute the first recording mode when performing recording on a crimped recording medium in which a sealing medium is crimped onto a recording surface after recording on the recording surface, and execute the second recording mode when performing recording on a recording medium that is not the crimped recording medium.

5. A recording method for controlling a recording unit configured to execute recording on a recording medium using a color material of cyan, magenta, yellow, and black, comprising:
   causing the recording unit to record an edge region of black data included in image data using at least the color material of black;
   causing the recording unit to record an inner region on an inner side of the edge region of the black data using at least the color material of cyan, magenta, and yellow; and
   setting the amount of the color material of black per unit area of the edge region to be greater than the amount of the color material of black per unit area of the inner region.

* * * * *